United States Patent
Farrokhabadi et al.

(10) Patent No.: US 11,133,676 B2
(45) Date of Patent: Sep. 28, 2021

(54) SYSTEM AND METHOD FOR FLUCTUATING RENEWABLE ENERGY-BATTERY OPTIMIZATION TO IMPROVE BATTERY LIFE-TIME

(71) Applicant: BluWave Inc., Ottawa (CA)

(72) Inventors: Mostafa Farrokhabadi, Ottawa (CA); Parham Momtahan, Ottawa (CA)

(73) Assignee: BluWave Inc., Ottawa (CA)

( * ) Notice: Subject to any disclaimer, the term of this patent is extended or adjusted under 35 U.S.C. 154(b) by 46 days.

(21) Appl. No.: 16/513,163

(22) Filed: Jul. 16, 2019

(65) Prior Publication Data
US 2020/0028363 A1  Jan. 23, 2020

Related U.S. Application Data

(60) Provisional application No. 62/699,317, filed on Jul. 17, 2018.

(51) Int. Cl.
*H02J 3/32* (2006.01)
*H02J 3/38* (2006.01)
*G05B 13/04* (2006.01)

(52) U.S. Cl.
CPC .............. *H02J 3/32* (2013.01); *G05B 13/042* (2013.01); *G05B 13/048* (2013.01); *H02J 3/382* (2013.01); *H02J 2203/20* (2020.01)

(58) Field of Classification Search
CPC .......... H02J 3/32; H02J 3/382; H02J 2203/20; G05B 13/042; G05B 13/048
USPC ....................................................... 700/287
See application file for complete search history.

(56) References Cited

U.S. PATENT DOCUMENTS

| | | |
|---|---|---|
| 2010/0076613 A1* | 3/2010 | Imes ...................... G06Q 50/06 700/287 |
| 2010/0179704 A1 | 7/2010 | Ozog |
| 2011/0035073 A1 | 2/2011 | Ozog |
| 2013/0024014 A1 | 1/2013 | Sharma et al. |
| 2016/0043548 A1 | 2/2016 | Bozchalui et al. |
| 2016/0241042 A1* | 8/2016 | Mammoli ............... H02J 3/386 |
| 2017/0194792 A1* | 7/2017 | Zimmanck .............. H02J 3/381 |

OTHER PUBLICATIONS

International Search Report for PCT/IB2019/056123, dated Sep. 18, 2019, 4 pages.
Written Opinion for PCT/IB2019/056123, dated Sep. 18, 2019, 6 pages.

* cited by examiner

*Primary Examiner* — Jigneshkumar C Patel
(74) *Attorney, Agent, or Firm* — Sterne, Kessler, Goldstein & Fox P.L.L.C.

(57) ABSTRACT

A system and method for energy optimization is disclosed. The system may collect information from an information collector data including energy usage and storage data of at least one renewable energy generation system and battery energy storage system (BESS). The system may identify historical events that result in curtailment of renewable energy production, determine whether there is a curtailment of renewable energy production based at least on one historical event supervise the charge and discharge cycles of the at least one BESS; and ensuring that the diesel generators minimum up/down time is satisfied based on controlling at least one parameter of the BESS.

20 Claims, 10 Drawing Sheets

SYSTEM AND METHOD FOR FLUCTUATING RENEWABLE ENERGY-BATTERY OPTIMIZATION TO IMPROVE BATTERY LIFE-TIME

CROSS REFERENCE TO RELATED APPLICATIONS

This application claims the benefit of U.S. Provisional Application No. 62/699,317, filed Jul. 17, 2018 and entitled "System and Method for Fluctuating Renewable Energy-Battery Optimization to Improve Battery Life-Time," which is incorporated herein by reference in its entirety.

TECHNICAL FIELD

The present disclosure relates to microgrid technology. More particularly, the present disclosure relates to optimization of energy use and distribution in renewable energy microgrids.

BACKGROUND

Power derived from renewable energy sources such as solar and wind is becoming increasingly relied upon. Renewable energy sources may have limitations that impede them from becoming widespread, low-cost, efficient, and continually viable sources of electricity. For example, renewable energy sources can be inherently unreliable, owing to factors such as changes in the time of day and variations in weather conditions that mean that maximized performance of components for each resource is very difficult to manage.

Further, renewable energy sources face storage issues as electricity grids may have limited inherent facility for storing electrical energy. This may require power to be generated constantly to meet uncertain demand, which often results in over-generation (and hence wasted energy) and sometimes results in under-generation (and hence power failures). Additionally, there is limited facility for storing electrical energy at the point of generation.

Microgrids are localized group of electricity sources and loads that normally operate connected to and synchronous with the traditional wide area synchronous grid (macrogrid), but can also disconnect to "island mode"- and function autonomously as required. In this way, a microgrid can effectively integrate various sources of distributed generation (DG), especially Renewable Energy Sources (RES), and can supply emergency power, changing between island and connected modes.

Control and protection are important elements for microgrids. Due to limitations of renewable energy sources, certain isolated microgrids with reduced tolerance for energy disruptions are less likely to use renewable energy sources. These microgrids are becoming increasingly prevalent in remote areas and enterprise campuses that require continuous operation with no tolerance for energy disruption. Conventionally, to avoid negative impacts on such microgrids, renewable energy sources are curtailed by operators, thus increasing environmental and economical energy costs.

Certain microgrids may also use Battery Energy Storage Systems (BESS) which store energy when there is sufficient renewable energy generation and release power when renewable energy generation is insufficient.

However, there exists a need for improved systems and methods of producing, storing, transmitting, distributing and delivering energy so that the needs of power customers can be satisfied from renewable energy sources.

SUMMARY

The systems and methods described herein address treatment of medium term fluctuating renewable energy output, including of wind and solar renewable energy systems, that can jeopardize operational constraints of diesel engines, leading to potential engine failures, in isolated microgrids with no tolerance for energy disruption.

Some embodiments described herein can reduce the renewable energy production curtailment in such systems through the use of a novel optimal control mechanism for Battery Energy Storage Systems (BESS). In at least some embodiments, a novel two-phase forecast and control platform (an external controller) can be used to supervise the BESS charge and discharge to mitigate the effects of renewable fluctuations, while minimizing the impact on the BESS cycling and thus life-time.

In one aspect there is disclosed a system for optimizing energy. The system may collect information from an information collector data including energy usage and storage data of at least one renewable energy generation system and battery energy storage system (BESS). The system may identify historical events that result in curtailment of renewable energy production, determine whether there is a curtailment of renewable energy production based at least on one historical event, supervise the charge and discharge cycles of the at least one BESS. The system also considers generators (such as diesel generators) minimum up/down time and uses the BESS to ensure such operational constraints are satisfied.

In another aspect there is a method of optimizing energy. The method includes collecting information from an information collector data including energy usage and storage data of at least one renewable energy generation system and battery energy storage system (BESS). The method further includes identifying historical events that result in curtailment of renewable energy production, determining whether there is a curtailment of renewable energy production based at least on one historical event and supervising the charge and discharge cycles of the at least one BESS. The system also considers generators (such as diesel generators) minimum up/down time and uses the BESS to ensure such operational constraints are satisfied.

In another aspect, there is disclosed a computer program product for optimizing energy production, the computer program product comprising a computer readable medium storing program code, wherein the program code, when run on a computer, causes the computer to: receive information collector data from at least one information collector, the information collector data comprising energy usage and storage data of at least one renewable energy generation system and battery energy storage system (BESS); identify historical events that result in curtailment of renewable energy production; determine whether there is a curtailment of renewable energy production of the at least one renewable energy generation system based at least on the historical events; supervise the charge and discharge cycles of the at least one BESS; the system also considers the generators (such as diesel generators) minimum up/down time and uses the BESS to ensure such operational constraints are satisfied.

DETAILED DESCRIPTION OF EMBODIMENTS

Figure 1:
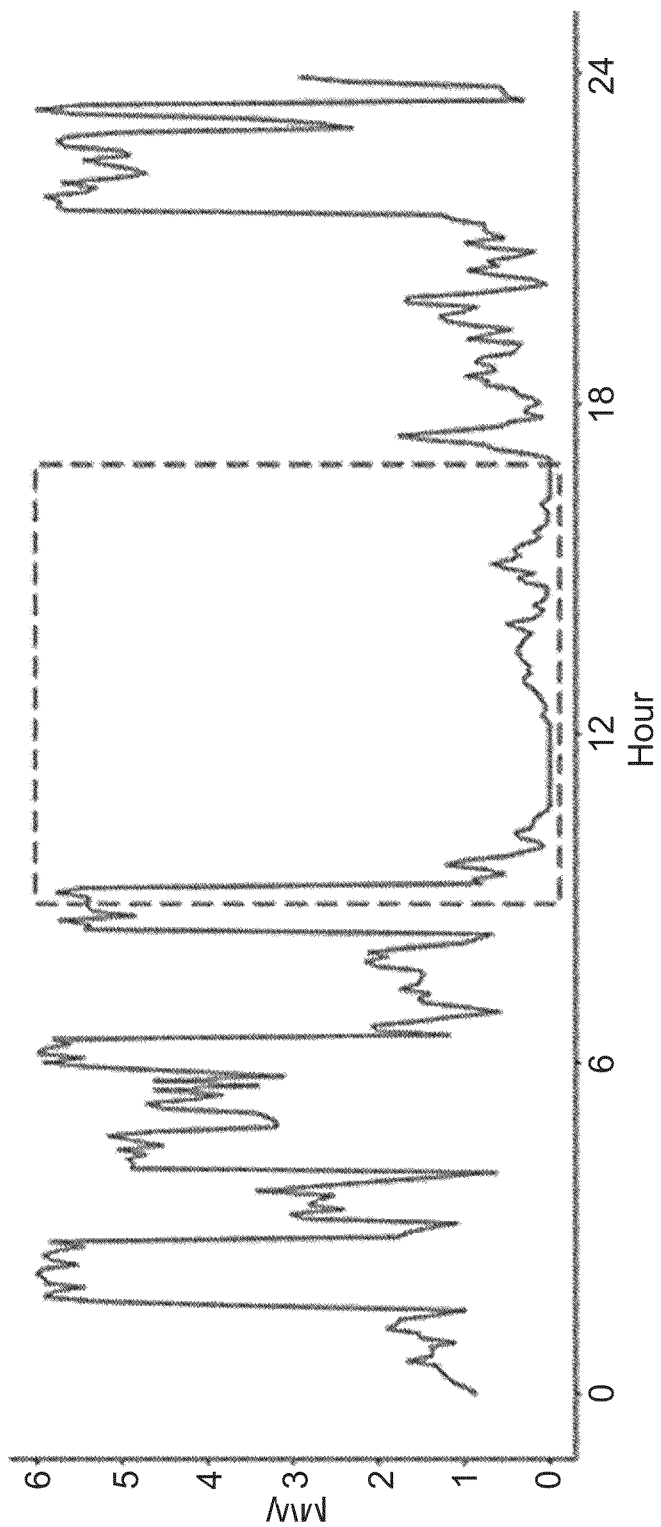
FIG. 1 is a plot of power generation over time for a renewable energy generation and storage system in one mode of operation.
Figure 2:
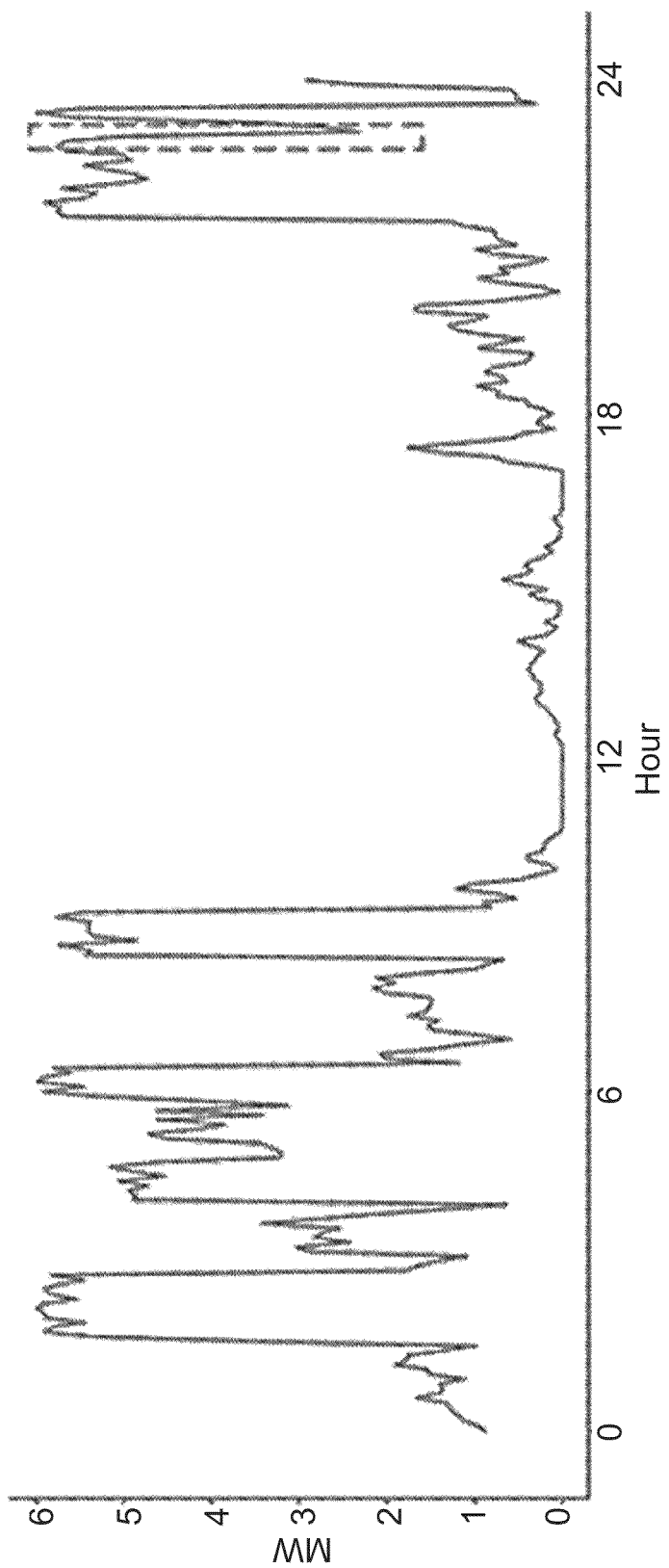
FIG. 2 is a plot of power generation over time for a renewable energy generation and storage system in another mode of operation.
Figure 3:
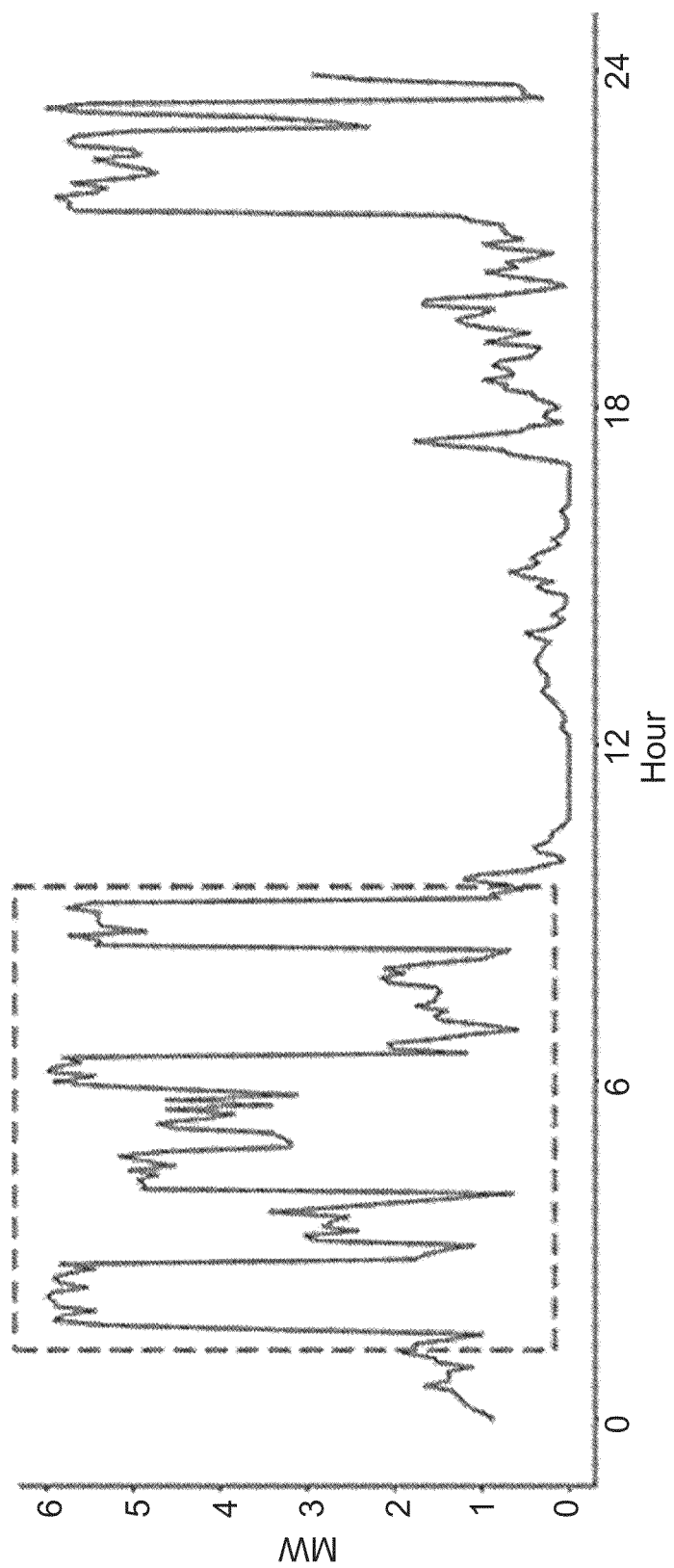
FIG. 3 is a plot of power generation over time for a renewable energy generation and storage system in another mode of operation.

Referring to FIGS. 1 to 3, example power generation profiles of conventional renewable energy microgrids are shown. The profiles shown in FIGS. 1 to 3 represent actual measurements obtained from wind turbines. In microgrids in which there is minimal tolerance for energy disruption, the state of charge (SOC) of the BESS tends to be kept at the maximum level during normal operation. In these cases, the BESS primary controller, generally has a sampling rate in the range of one hundred milliseconds, and can receive the following set-points:

$P^{Max}$: The limit for the power injection at the point of common coupling (PCC), beyond which the BESS charges to maintain the injection level at the limit.

$P^{Min}$: The limit for the power injection at the PCC, below which the BESS discharges to maintain the injection level at the limit.

$R_{ch,dch}$: The power rate of the BESS controlling the charging/discharging speed.

$R_{Thresh}$: The threshold for the rate of renewable energy output changes, beyond which the BESS charges or discharges. By default, this threshold is set relatively high, avoiding continuous charging/discharging of the BESS due to life-time concerns.

As seen in FIGS. 1 to 3, there are generally three operational states for such systems. FIG. 1 shows a first operational state in which there is a sustained renewable energy output decrease. The sustained decrease is represented by the dotted box in FIG. 1. In the microgrids described above, the BESS primary controller compensates for such a power drop, through the appropriate choice of $P^{Min}$, thus giving the diesel engines enough time to ramp up or turn on.

FIG. 2 shows a second operational state in which the renewable energy output rapidly decreases. This sudden decrease is shown by the dotted box. In such cases, the governors of the diesel engines would address this problem by increasing the production of the engine, thus the BESS would not discharge any power, unless the injected power falls below $P^{Min}$.

In cases where there are large and sustained renewable energy output fluctuations (shown in the dotted box in FIG. 3), this leads to considerable mechanical stress on diesel engines and jeopardizes the operational constraints such as the minimum up/down time of the engine.

Figure 4:
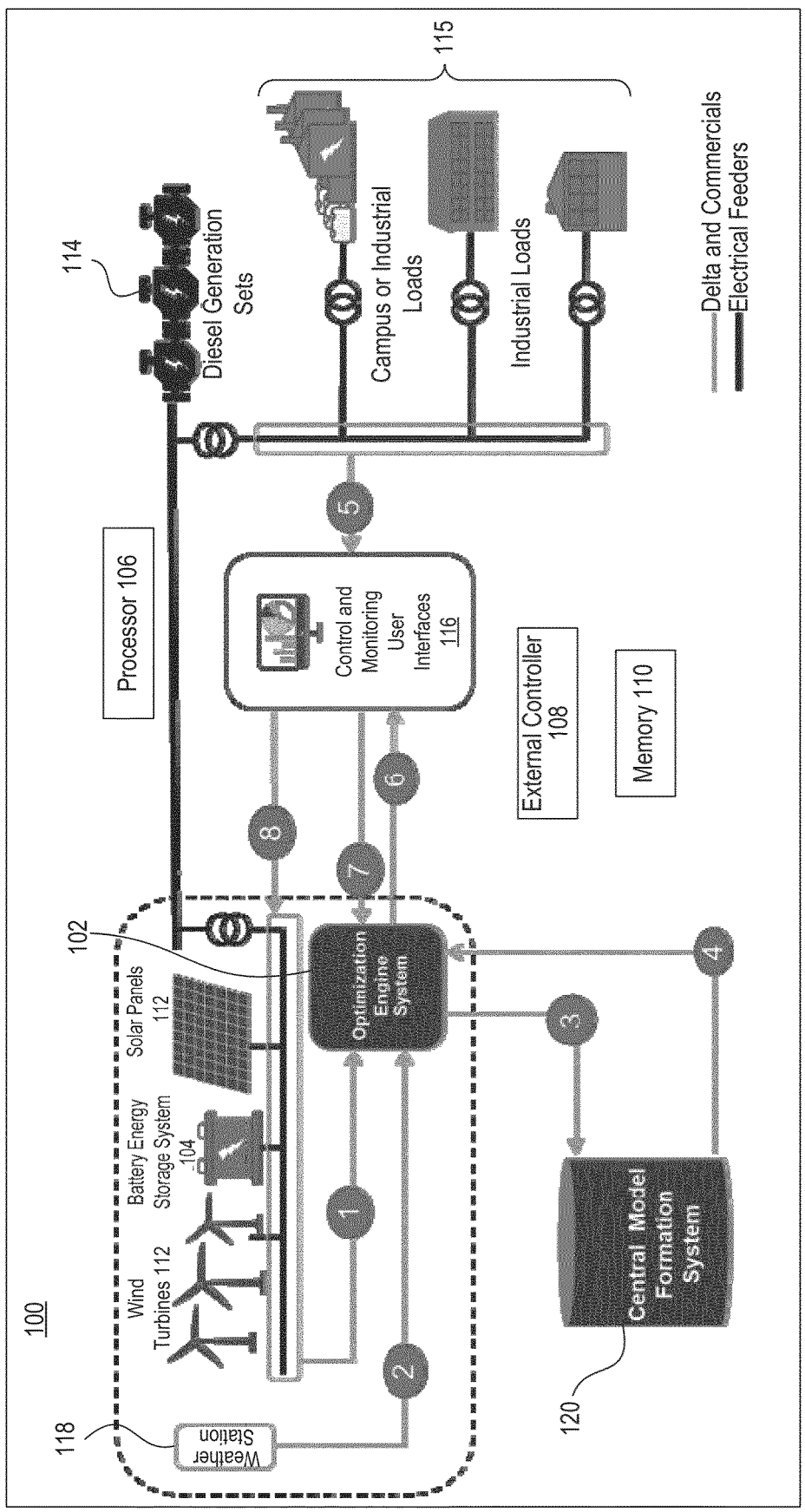
FIG. 4 is a block diagrammatic view of an example microgrid optimization system in accordance with one embodiment of the present disclosure.

Referring to FIG. 4, an example microgrid optimization engine 102 and method are disclosed. The system includes an optimization engine 102. The system 100 includes a processor 106 and memory 110. The memory contains instructions that can be executed by the processor and which when executed, cause the system 100 to perform the steps described herein. For example, in at least some embodiments, the optimization engine 102 is configured to obtain historical renewable output data to obtain a profile of the operational states shown in FIGS. 1 to 3.

The system also includes a battery energy storage system 104 that includes a primary controller as described above and an external controller 108 that can be used to supervise the BESS charge and discharge to mitigate the effects of fluctuations of renewable energy generation sets/devices 112 (for example, wind turbines, solar panels) on generators 114. Generators 114 may include diesel generators, gas-powered generators, combined heat and power generators, and certain fuel cells. The system 100 also includes one or more industrial loads 115 such as residential or industrial loads that are operably connected to and draw power from one or more of the generation devices 112 as well as control and monitoring user interfaces 116. Interfaces 116 may include monitors, input/output devices such as touchscreen, keyboards, microphone for voice input, and the like.

In operation, renewable energy generation and BESS measurements and status data including power generation output can be received from the BESS 104 and the renewable energy generation sets 112 and feedback into optimization engine 102 (signal 1) by means of one or more communication subsystems within processor 106 or by means of shared memory 110. Similarly, weather data including weather forecasts can be received from one or more weather stations 118 and transmitted to optimization engine 102 (signal 2). Weather stations 118 can be external to the system 100. The data can then be used to calculate the optimization function as described further herein.

In particular, optimization engine 102 can aggregate microgrid data obtained as input and send it as output to a central model formation system 120 (signal 3) that is configured to execute the algorithms described herein by means of artificial intelligence (AI) assisted optimization and calculation. The output can then be fed back to the optimization engine 102 by the central model formation system 120 (signal 4). Consumer load and diesel generation measurements (signal 5) can be obtained from the loads 115 and generators 114 and input into the user interfaces 116.

Subsequently, variability forecasts, and generation control signals (signal 6) can be output from the optimization engine 102 to the user interfaces 116 and diesel generation and load measurements, alerts, and operator over-ride controls (signal 7) can be output as instructions or commands from the user interfaces 116 to the optimization engine 102. Finally, BESS and curtailment control signals (signal 8) are output from the user interfaces 116 to the BESS 102 and renewable energy devices 112 based on instructions or calculations from the optimization engine 102.

In these microgrids, the parameters of interest are the renewable energy output standard deviation, $\sigma_{wind}$, on a rolling renewable energy system of length p, and a threshold standard deviation $\sigma_\tau$. The historical events that result in renewable energy production curtailment are first identified. These historical events are basically past wind output fluctuations that resulted into wind output being curtailed by the operator. Next, a threshold standard deviation $\sigma_\tau$ and length p are determined based on the parameters of the system 100. In a wind turbine system, a scenario in which the standard deviation of wind speed exceeds a threshold ($\sigma_{Wind} > \sigma_\tau$) is the necessary and sufficient condition for a renewable energy curtailment event.

Figure 8:
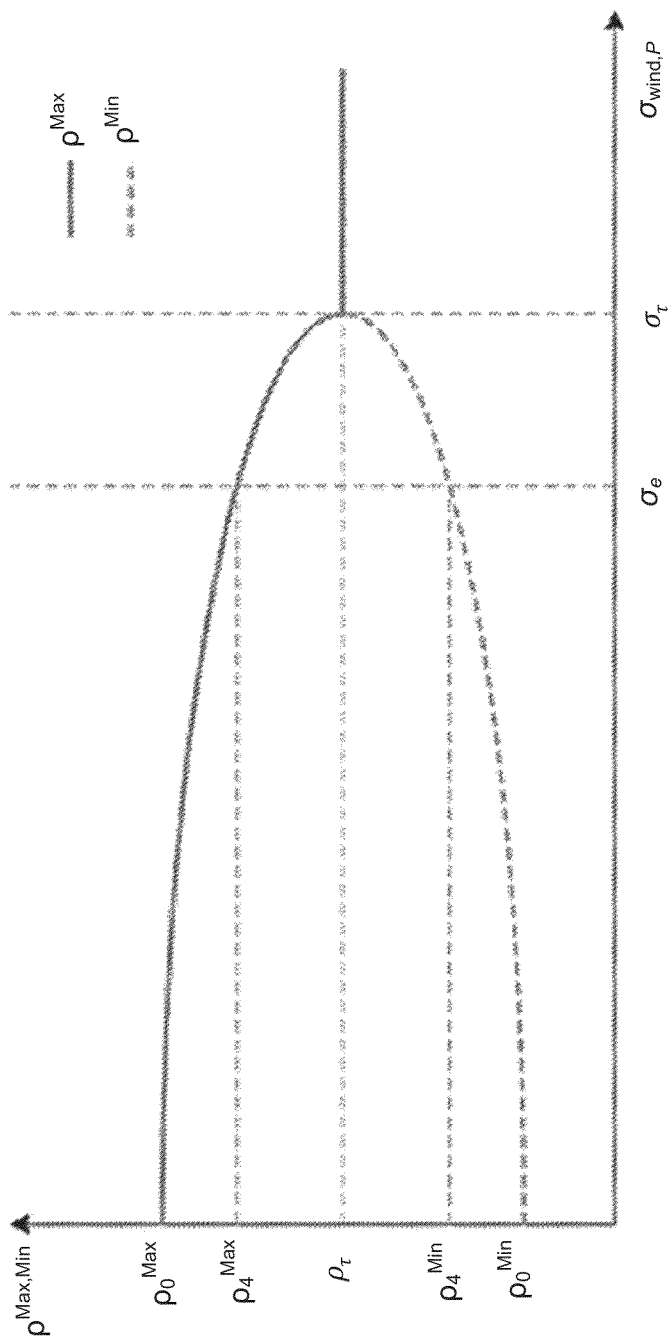
FIG. 8 is a plot showing power generation against renewable energy output standard deviation of an example microgrid optimization system.
Figure 9:
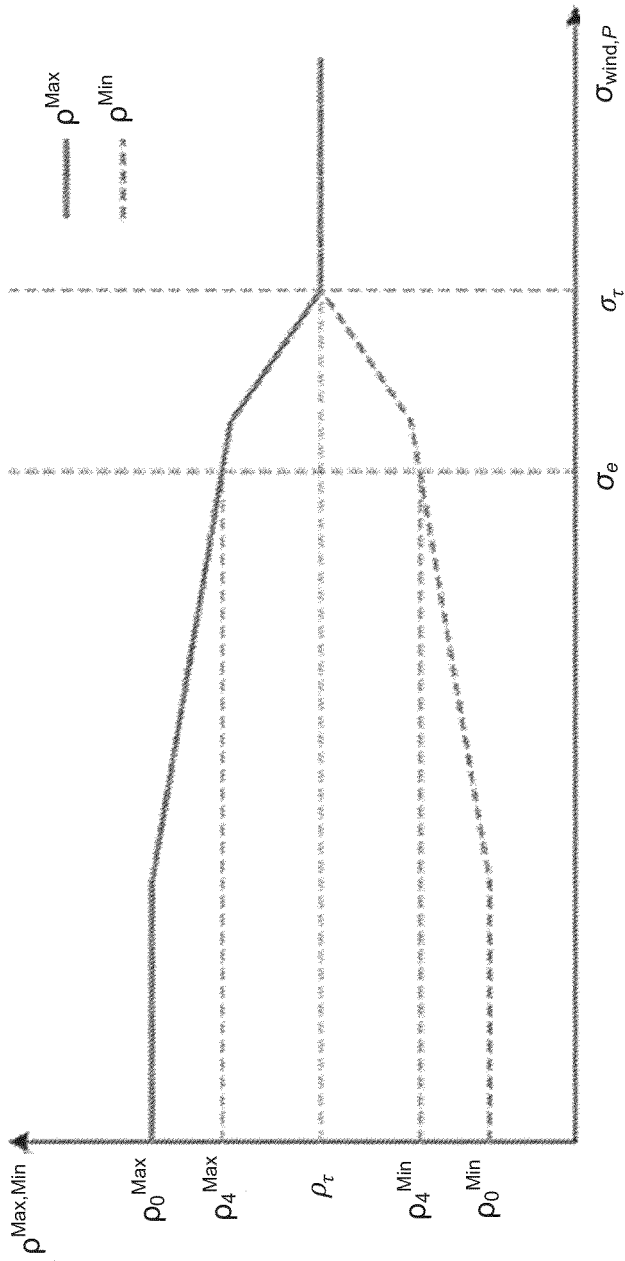
FIG. 9 is a plot showing power generation against renewable energy output standard deviation of an example microgrid optimization system.

Referring to FIGS. 8 to 9, energy efficiency droop diagrams are disclosed showing the power generation against the standard deviation of wind of an example BESS. As shown in FIG. 4, as the $\sigma_{wind}$ increases, the $\rho^{Max}$ decreases while the $\rho^{Min}$ increases. As a result, the battery starts to charge/discharge to alleviate the renewable fluctuations, thus yielding a lower $\sigma_{Wind}$. Hence, the system resembles a non-cooperative game involving $\rho^{Max,Min}$ and $\sigma_{Wind}$, and as a result, it will settle down to the so-called Nash Equilibrium with respect to $\sigma_e$, $\rho_e^{Max}$, and $\rho_e^{Min}$. Theoretically, $\sigma_e$ is always less than $\sigma_\tau$. This tends to be true for continuous variables. In practice, the proposed mechanism update rate depends on technical requirements and communication bandwidth.

Various droop mechanisms can be used. For example, mechanisms corresponding to droop diagrams shown in FIG. 8 can be any parabolic equation exhibiting similar characteristics. As an example, an appropriate $\rho^{Max}$ can be calculated using the following equation:

$$P^{Max} = 2(P_0^{Max} - P_\tau)\left(\frac{1}{1+e^{(\sigma - \sigma_\tau)}} - 0.5\right) + P_\tau \quad (1)$$

$$P^{Min} = -2(P_0^{Min} - P_\tau)\left(\frac{1}{1+e^{(\sigma - \sigma_\tau)}} - 0.5\right) + P_\tau \quad (2)$$

In some embodiments, a droop mechanism that can be represented by a piece-wise linear diagram (as shown in FIG. 9) can be used. The appropriate $\rho^{Max}$ and $\rho^{Min}$ can be calculated as a series of linear equations, as would be understood in the art.

Figure 10:
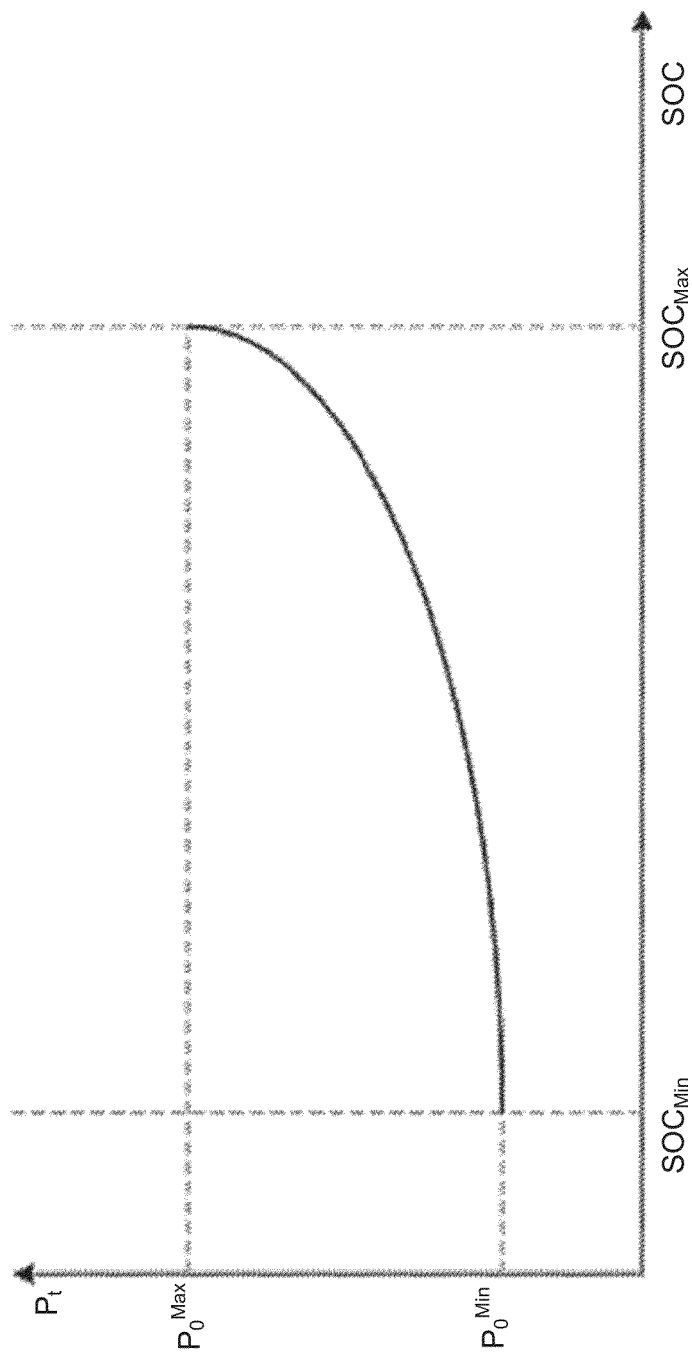
FIG. 10 is a plot showing power generation against the state of charge of an example microgrid optimization system.

Referring to FIG. 10, the state of charge (SOC) of the battery can be controlled by a SOC vs. $\rho_\tau$ droop mechanism. As seen in FIG. 10, a parabolic choice of droop is proposed to keep the battery SOC closer to the $SOC_{Max}$. A parabolic equation similar to (2) can be used. Alternatively, a piece-wise linear droop, similar to the one represented by FIG. 9 can be used.

Obtaining the desired system performance depends on an appropriate choice of $\sigma_\tau$, $\rho$, $P_0^{Max}$, and $P_0^{Min}$. These parameters depend on the operating condition of system 100, including the number of operating diesel generators (gensets), their output level, and their minimum up/down time. In some embodiments, the choice of these values can be conservative and based on experimental studies on past data. In these cases, a careful analysis of historical data, along with detailed simulation studies, would be required to ensure the operational stability and appropriate coordination with the primary controller of BESS 104.

Figure 5:
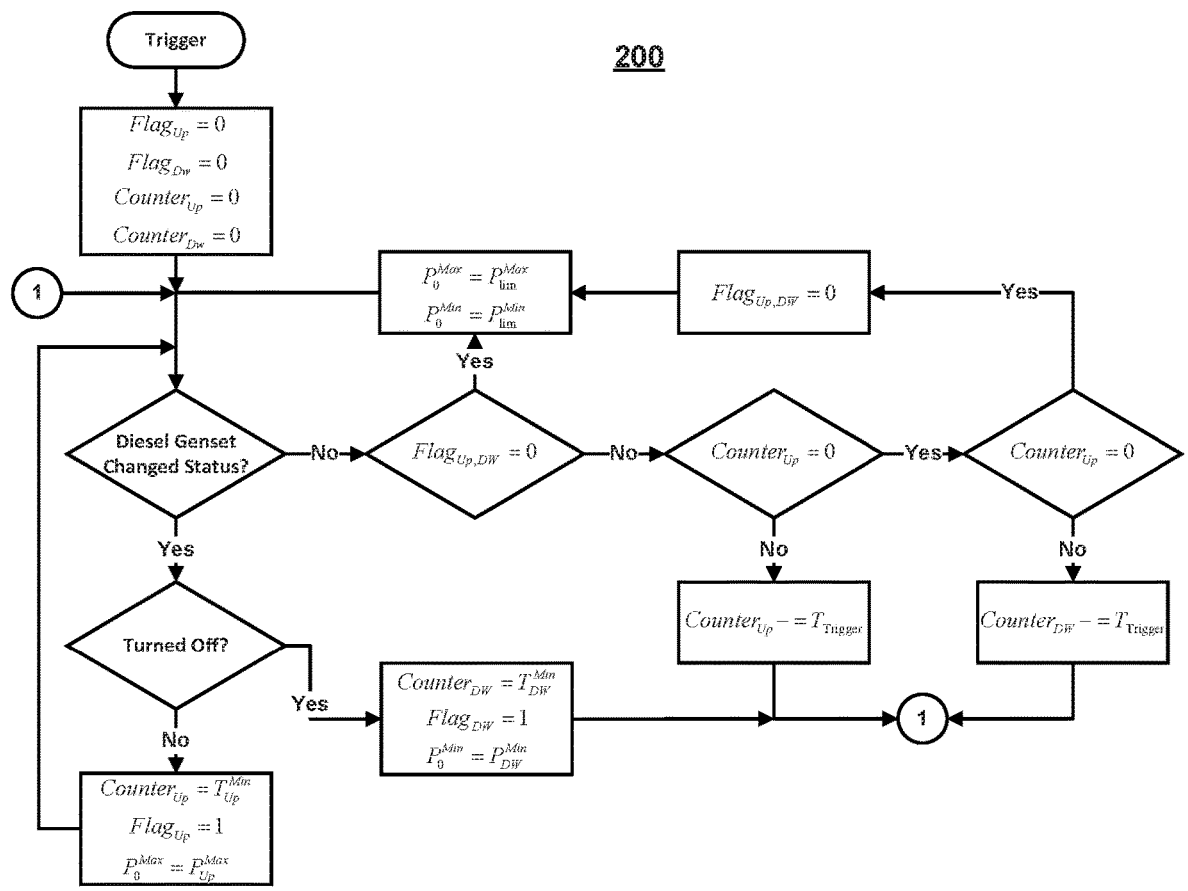
FIG. 5 is a flow diagram of a method of optimizing a microgrid in accordance with one embodiment of the present disclosure.

Referring to FIG. 5, a flow chart of a method 200 for determining an appropriate $P_0^{Max,Min}$ is disclosed. The method ensures that the diesel gensets minimum up/down time is satisfied. In example embodiments, the method 200 is carried out more frequently than the external controller 108, and ideally in a comparable update rate to the primary controller of BESS 104.

In FIG. 5, $Flag_{Up,Dw}$ are two binary variables indicating if a diesel genset is currently on/off and cannot change status, $Counter_{Up,Dw}$ are variables for the remaining time until which a unit cannot be turned off/on, $T_{Up,Dw}^{Min}$ are the minimum up/down time and units $P_{Lim}^{Max,Min}$ are the set-point limits of $P^{Max,Min}$ and $P_{DW}^{Min}$ are the power injection limits at the Power control centre (PCC) beyond which a diesel genset has to turn off/on.

The optimization mechanism shown in FIG. 5 can be further improved by including a Model Predictive Control (MPC) optimizer, which relies on AI-assisted predictions and calculations. The first step in implementing the MPC optimizer requires determining predictions of $\mu_w$ and $\sigma_w$, the renewable energy output mean and standard deviation respectively, for a certain upcoming time horizon (e.g., 12 hours). The prediction interval would be p, as defined previously. Based on the predicted mean and standard deviation, two other parameters, $\mathcal{H}$ and $\mathcal{L}$ can be predicted. $\mathcal{H}$ represents the percentage of the prediction interval during which the renewable output is higher than $\mu_w$, and $\mathcal{L} = 1 - \mathcal{H}$. It is assumed that the renewable energy output during the interval is either $\mathcal{H}$ or $W_\mathcal{L}$, satisfying the following system of equations:

$$\sigma_W^2 = (W_\mathcal{L} - \mu_W)^2 + (W_\mathcal{H} - \mu_W)^2 \quad (3)$$

$$\mu_W = \mathcal{H} W_\mathcal{H} + (1 - \mathcal{H}) W_\mathcal{L} \quad (4)$$

Based on the obtained values of $W_\mathcal{H}$ or $W_\mathcal{L}$, it is possible to formulate a MPC optimizer using the following function:

Obj: min (5)

$$\left\{ \alpha \sum_{k \in T} [(W_{\mathcal{H}_k} - P_k^{Max}) + (P_k^{Min} - W_{\mathcal{L}_k})] + \beta \sum_{k \in T} (SOC_{Max} - SOC_k)^2 \right\}$$

S.t.

$\sigma_{inj_k} \leq \sigma_\tau \forall k \in T$ $SOC_{Min} \leq SOC_k \leq SOC_{Max} \forall k \in T$ $P_{Limit}^{Min} \leq P_k^{Min} \leq P_k^{Max} \leq P_{Limit}^{Max} \forall k \in T$ $\gamma_k(P_k^{Max} - W_{\mathcal{H}_k}) + (1 - \gamma_k)(W_{\mathcal{H}_k} - P_k^{Max}) \geq 0 \ \forall k \in T$ $\delta_k(W_{\mathcal{L}_k} - P_k^{Min}) + (1 - \delta_k)(P_k^{Min} - W_{\mathcal{L}_k}) \geq 0 \ \forall k \in T \quad (6)$ In the model shown above, K is a time-interval that belongs to set of time-intervals, T, within the optimization horizon. $p^{Max}$ and $p^{Min}$ are the decision variables. $SOC_{Max,Min}$ are the maximum and minimum limits of the SOC. $P_{Limit}^{Max,Min}$ are the set-point limits of $P^{Max,Min}$. $\alpha$ and $\beta$ are arbitrary coefficients of the objective function, $W_\mathcal{H}$ and $W_\mathcal{L}$ are the optimization parameters obtained from (3) and (4), and $\gamma_k$ and $\delta_k$ are binary variables indicating if $p^{Max,Min}$ are higher or lower than $W_{\mathcal{H},\mathcal{L}}$. $\sigma inj_k$ is the estimated standard deviation of the injected power at the PCC during the time interval k.

$SOC_k$ can be calculated as follows:

$$\sigma_{inj_k} \approx \begin{cases} (P_k^{Max} - \mu_{W_k})^2 + (P_k^{Min} - \mu_{W_k})^2 & \text{if } \gamma_k = \delta_k = 0 \\ (P_k^{Max} - \mu_{W_k})^2 + (W_{\mathcal{L}_k} - \mu_{W_k})^2 & \text{if } \gamma_k = 0 \text{ and } \delta_k = 1 \\ (W_{\mathcal{H}_k} - \mu_{W_k})^2 + (P_k^{Min} - \mu_{W_k})^2 & \text{if } \gamma_k = 1 \text{ and } \delta_k = 0 \\ \sigma_{W_k} & \text{if } \gamma_k = 1 = \delta_k = 0 \end{cases} \quad \forall k \in T \quad (7)$$

$$SOC_k = SOC_{k-1} + k[(1-\gamma_k)(P_k^{Max} - \mu_{W_k}) + (1-\delta_k)(P_k^{Min} - \mu_{W_k})] \quad \forall k \in T \quad (8)$$

Figure 6:
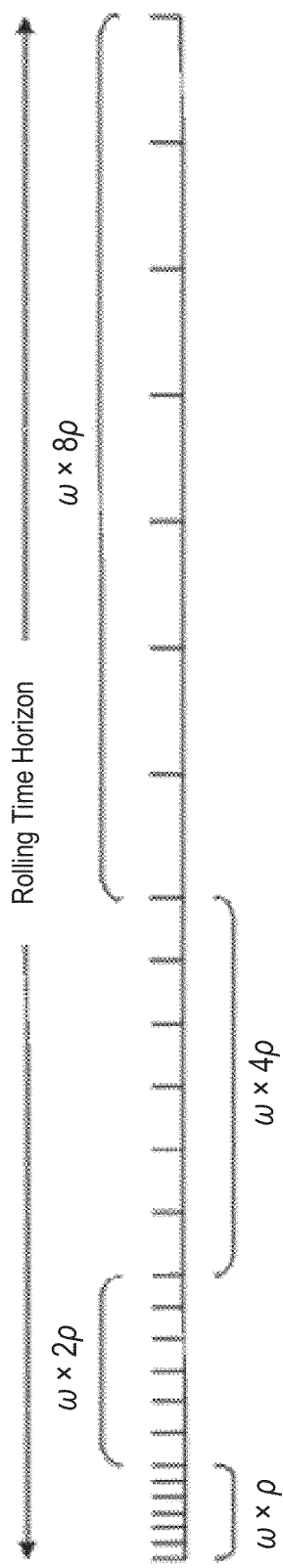
FIG. 6 is a plot showing the optimization of a microgrid system over time.

As discussed above, such a MPC-based optimization is carried out for a certain time horizon with the time intervals of ρ multiples, as shown in FIG. 6.

Figure 7:
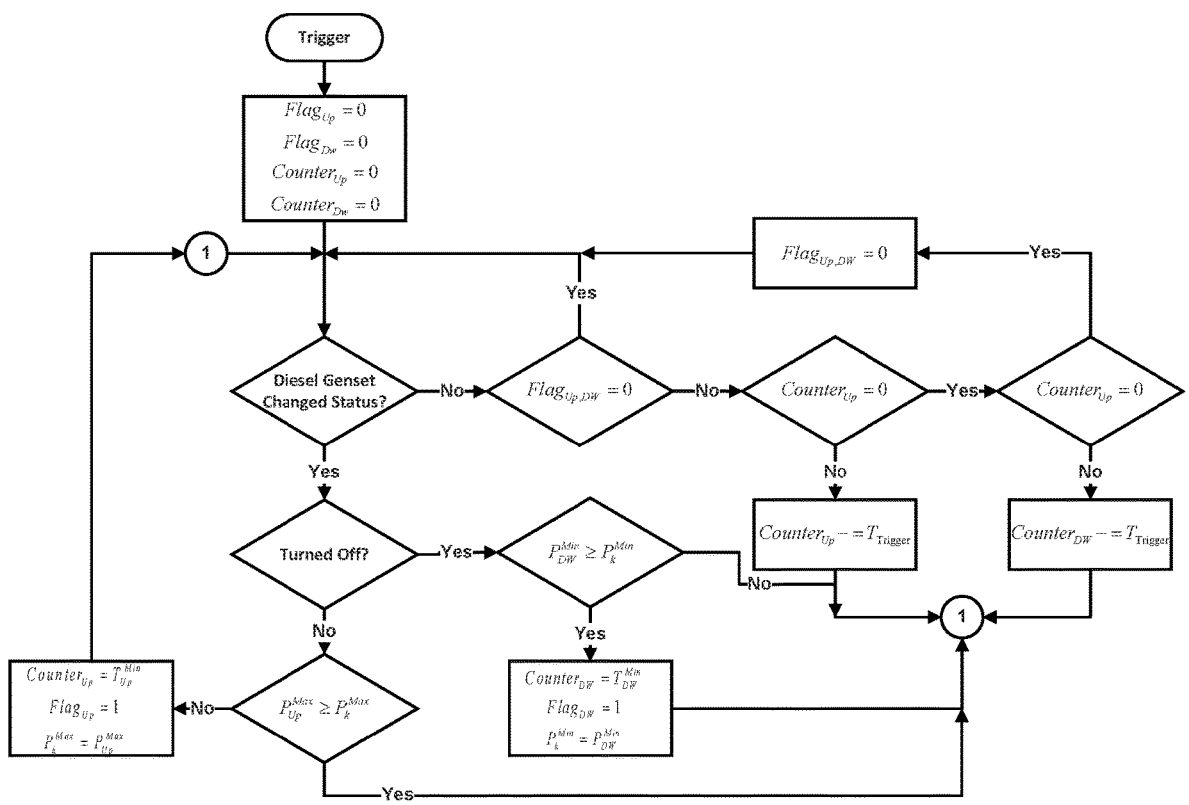
FIG. 7 is a flow diagram of a method of optimizing a microgrid in accordance with another embodiment of the present disclosure.

A similar mechanism can be implemented to ensure that the diesel gensets minimum up/down time is satisfied. For example, a sample technique is illustrated in FIG. 7. In some embodiments, the mechanism proposed in FIG. 7 is carried out more frequently than the external controller.

The advantage of the optimization engine 102 as described herein is that the ESS charging/discharging cycle is part of the objective function; thus, the technique proposed in this section attempts to minimize the ESS cycle, hence maximizing battery life, while ensuring that the renewable energy output variability is within acceptable ranges.

As applicable, at least some of the described embodiments may similarly apply to applications outside of wind generation systems such as solar, thermal, and the like.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps.

Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa.

Reference to such words as "sending" or "receiving" could be interchanged depending on the perspective of the particular device.

The above-discussed embodiments are considered to be illustrative and not restrictive. Embodiments described as methods would similarly apply to systems, and vice-versa.

Variations may be made to some embodiments, which may include combinations and sub-combinations of any of the above. The various embodiments presented above are merely examples and are in no way meant to limit the scope of this disclosure.

Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A system for energy optimization, the system comprising:
   a processor; and
   a memory coupled to the processor, the memory storing computer executable instructions that, when executed by the processor, cause the system to:
      receive information collector data from at least one information collector, the information collector data comprising energy usage and storage data of a renewable energy generation system that includes a battery energy storage system (BESS);
      identify historical events that result in curtailment of renewable energy production;
      determine whether there is a curtailment of renewable energy production of the renewable energy generation system based at least on the historical events;
      supervise charge and discharge cycles of the BESS;
      operate a generator operably connected to the BESS based on the information collector data and historical events;
      ensure that a minimum up/down time of the generator is satisfied based on controlling at least one parameter of the BESS; and
      determine a model predictive control optimization function wherein the model predictive control optimization function is represented at least partially by:

Obj: min $$\left\{ \alpha \sum_{k \in T} [(W_{\mathcal{H}_k} - P_k^{Max}) + (P_k^{Min} - W_{\mathcal{L}_k})] + \beta \sum_{k \in T} (SOC_{Max} - SOC_k)^2 \right\}$$

S.t.

$\sigma_{inj_k} \leq \sigma_\tau \quad \forall k \in T$ $SOC_{Min} \leq SOC_k \leq SOC_{Max} \quad \forall k \in T$ $P_{Limit}^{Min} \leq P_k^{Min} \leq P_k^{Max} \leq P_{Limit}^{Max} \quad \forall k \in T$ $\gamma_k(P_k^{Max} - W_{\mathcal{H}_k}) + (1-\gamma_k)(W_{\mathcal{H}_k} - P_k^{Max}) \geq 0 \quad \forall k \in T$ $\delta_k(W_{\mathcal{L}_k} - P_k^{Min}) + (1-\delta_k)(P_k^{Min} - W_{\mathcal{L}_k}) \geq 0 \quad \forall k \in T,$ wherein α and β are coefficients of the model predictive control optimization function, k is a time interval within a set of time intervals T, $\gamma_k$ and $\delta_k$ are binary variables, $W_{\mathcal{H}_k}$ and $W_{L_k}$ are optimization parameters, $P_k^{Max}$ and $P_k^{Min}$ are respective decision variables at the time interval k, with $P_{Limit}^{Max}$ and $P_{Limit}^{Min}$ being set-point limits, $SOC_{Max}$, $SOC_{Min}$ and $SOC_k$ are maximum limit, minimum limit, and kth states of charge (SOC), $\sigma_{inj_k}$ is an estimated standard deviation of injected power during the time interval k, and $\sigma_\tau$ is a threshold standard deviation.

2. The system of claim 1, wherein the system is configured to operate in near real-time by operating using a predetermined time interval or less.

3. The system of claim 1, wherein the energy usage and storage data includes overall energy usage data, required energy reductions, required demand reductions, cost of energy data, and data regarding distribution of energy.

4. The system of claim 1, wherein the generator is a diesel generator.

5. The system of claim 1, wherein the generator is a gas-powered generator.

6. The system of claim 1, wherein the generator is a combined heat and power generator.

7. The system of claim 1, wherein the renewable energy generation system further includes one or more wind turbines.

8. The system of claim 1, wherein the renewable energy generation system further includes one or more solar panels.

9. A method for energy optimization comprising:
receiving information collector data from at least one information collector, the information collector data comprising energy usage and storage data of a renewable energy generation system that includes a battery energy storage system (BESS);
identifying historical events that result in curtailment of renewable energy production;
determining whether there is a curtailment of renewable energy production of the renewable energy generation system based at least on the historical events;
supervising charge and discharge cycles of the BESS;
operating a generator operably connected to the BESS based on the information collector data and historical events;
ensuring that a minimum up/down time of the generator is satisfied based on controlling the BESS; and
determining a model predictive control optimization function, wherein the model predictive control optimization function is represented at least partially by:

Obj: min $$\left\{\alpha \sum_{k \in T} [(W_{\mathcal{H}_k} - P_k^{Max}) + (P_k^{Min} - W_{\mathcal{L}_k})] + \beta \sum_{k \in T} (SOC_{Max} - SOC_k)^2\right\}$$

S.t.

$$\sigma_{inj_k} \leq \sigma_\tau \quad \forall k \in T$$

$$SOC_{Min} \leq SOC_k \leq SOC_{Max} \quad \forall k \in T$$

$$P_{Limit}^{Min} \leq P_k^{Min} \leq P_k^{Max} \leq P_{Limit}^{Max} \quad \forall k \in T$$

$$\gamma_k(P_k^{Max} - W_{\mathcal{H}_k}) + (1 - \gamma_k)(W_{\mathcal{H}_k} - P_k^{Max}) \geq 0 \quad \forall k \in T$$

$$\delta_k(W_{\mathcal{L}_k} - P_k^{Min}) + (1 - \delta_k)(P_k^{Min} - W_{\mathcal{L}_k}) \geq 0 \quad \forall k \in T,$$

wherein $\alpha$ and $\beta$ are coefficients of the model predictive control optimization function, k is a time interval within a set of time intervals T, $\gamma_k$ and $\delta_k$ are binary variables, $W_{\mathcal{H}_k}$ and $W_{\mathcal{L}_k}$ are optimization parameters, $P_k^{Max}$ and $P_k^{Min}$ are respective decision variables at the time interval k, with $P_{Limit}^{Max}$ and $P_{Limit}^{Min}$ being set-point limits, $SOC_{Max}$, $SOC_{Min}$ and $SOC_k$ are maximum limit, minimum limit, and kth states of charge (SOC), $\sigma_{inj_k}$ is an estimated standard deviation of injected power during the time interval k, and $\sigma_\tau$ is a threshold standard deviation.

10. The method of claim 9, wherein the method is executed in near real-time, wherein near real-time is operating using a predetermined time interval or less.

11. The method of claim 9, wherein the energy usage and storage data includes overall energy usage data, required energy reductions, required demand reductions, cost of energy data, and data regarding distribution of energy.

12. The method of claim 9, wherein the generator is a diesel generator.

13. The method of claim 9, wherein the generator is a gas-powered generator.

14. The method of claim 9, wherein the generator is a combined heat and power generator.

15. The method of claim 9, wherein the renewable energy generation system further includes one or more wind turbines.

16. The method of claim 9, wherein the renewable energy generation system further includes one or more solar panels.

17. A computer program product for optimizing energy production, the computer program product comprising a non-transitory computer readable medium storing program code, wherein the program code, when run on a computer, causes the computer to:
receive information collector data from at least one information collector, the information collector data comprising energy usage and storage data of a renewable energy generation system that includes a battery energy storage system (BESS);
identify historical events that result in curtailment of renewable energy production;
determine whether there is a curtailment of renewable energy production of the renewable energy generation system based at least on the historical events;
supervise charge and discharge cycles of the BESS;
operate a generator operably connected to the BESS based on the information collector data and historical events;
ensuring that a minimum up/down time of the generator is satisfied based on controlling at least one parameter of the BESS;
determine a model predictive control optimization function, wherein the model predictive control optimization function is represented at least partially by:

Obj: min $$\left\{\alpha \sum_{k \in T} [(W_{\mathcal{H}_k} - P_k^{Max}) + (P_k^{Min} - W_{\mathcal{L}_k})] + \beta \sum_{k \in T} (SOC_{Max} - SOC_k)^2\right\}$$

S.t.

$$\sigma_{inj_k} \leq \sigma_\tau \quad \forall k \in T$$

$$SOC_{Min} \leq SOC_k \leq SOC_{Max} \quad \forall k \in T$$

$$P_{Limit}^{Min} \leq P_k^{Min} \leq P_k^{Max} \leq P_{Limit}^{Max} \quad \forall k \in T$$

$$\gamma_k(P_k^{Max} - W_{\mathcal{H}_k}) + (1 - \gamma_k)(W_{\mathcal{H}_k} - P_k^{Max}) \geq 0 \quad \forall k \in T$$

$$\delta_k(W_{\mathcal{L}_k} - P_k^{Min}) + (1 - \delta_k)(P_k^{Min} - W_{\mathcal{L}_k}) \geq 0 \quad \forall k \in T,$$

wherein $\alpha$ and $\beta$ are coefficients of the model predictive control optimization function, k is a time interval within a set of time intervals T, $\gamma_k$ and $\delta_k$ are binary variables, $W_{\mathcal{H}_k}$ and $W_{L_k}$ are optimization parameters, $P_k^{Max}$ and $P_k^{Min}$ are respective decision variables at the time interval k, with $P_{Limit}^{Max}$ and $P_{Limit}^{Min}$ being set-point limits, $SOC_{Max}$, $SOC_{Min}$ and $SOC_k$ are maximum limit, minimum limit, and kth states of charge (SOC), $\sigma_{inj_k}$ is an estimated standard deviation of injected power during the time interval k, and $\sigma_\tau$ is a threshold standard deviation.

18. The computer program product of claim 17, wherein the renewable energy generation system is configured to operate in near real-time by using a predetermined time interval or less.

19. The computer program product of claim 17, wherein the energy usage and storage data includes overall energy usage data, required energy reductions, required demand reductions, cost of energy data, and data regarding distribution of energy.

20. The computer program product of claim 17, wherein the generator is a diesel generator.

* * * * *